United States Patent
Shibata et al.

(10) Patent No.: US 7,322,665 B2
(45) Date of Patent: Jan. 29, 2008

(54) INKJET PRINTING SYSTEM

(75) Inventors: Tsuyoshi Shibata, Yokohama (JP); Takashi Ochiai, Machida (JP); Eri Goto, Yokohama (JP); Hiromitsu Yamaguchi, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 245 days.

(21) Appl. No.: 11/296,279

(22) Filed: Dec. 8, 2005

(65) Prior Publication Data

US 2006/0125865 A1 Jun. 15, 2006

(30) Foreign Application Priority Data

Dec. 14, 2004 (JP) .............................. 2004-361849

(51) Int. Cl.
- *B41J 2/205* (2006.01)
- *B41J 29/38* (2006.01)
- *G06K 15/00* (2006.01)
- *G06F 15/00* (2006.01)

(52) U.S. Cl. ........................ 347/15; 347/9; 358/3.06; 358/1.9; 358/3.1

(58) Field of Classification Search ................ 347/15, 347/9; 358/3.06, 1.9, 3.1
See application file for complete search history.

(56) References Cited

U.S. PATENT DOCUMENTS

| 5,369,428 | A | 11/1994 | Maze et al. ............. 347/5 |
| 6,554,396 | B1 | 4/2003 | Mizutani ................ 347/41 |
| 6,612,678 | B2 | 9/2003 | Kato et al. .............. 347/19 |
| 7,130,083 | B1* | 10/2006 | Konno et al. .......... 358/3.06 |
| 2002/0027572 | A1 | 3/2002 | Kato et al. .............. 347/15 |
| 2006/0050318 | A1* | 3/2006 | Miyagi et al. ........ 358/3.13 |

FOREIGN PATENT DOCUMENTS

| JP | 6-135126 | 5/1994 |
| JP | 2001-129981 | 5/2001 |
| JP | 2002-86764 | 3/2002 |
| JP | 2002-144608 | 5/2002 |

* cited by examiner

*Primary Examiner*—Stephen Meier
*Assistant Examiner*—Rene Garcia, Jr.
(74) *Attorney, Agent, or Firm*—Fitzpatrick, Cella, Harper & Scinto

(57) ABSTRACT

In an inkjet printing apparatus which generates satellites droplets, problems in an image attributable to the satellites are mitigated as far as possible. For this purpose, each parameter is adjusted to satisfy a relationship such that the distance between positions of placement of a main droplet and a satellite substantially agrees with an integral multiple of the width of an index pattern. As a result, a satellite is likely to be placed in a position overlapping a dot formed by a main droplet printed in the same area of a pixel located in the vicinity of the satellite, which prevents satellites from placement blank positions where no dot should be printed. Thus, the influence of satellites is mitigated, and problems in an image attributable to satellite are reduced.

7 Claims, 16 Drawing Sheets

INKJET PRINTING SYSTEM

BACKGROUND OF THE INVENTION

1. Field of the Invention

The present invention relates to an inkjet printing system which forms an image by arranging dots on a printing medium using a printing head for ejecting ink in the form of droplets based on image data. In particular, the invention relates to a dot controlling method for suppressing problems of an image on a printing medium attributable to the fact that an ejected ink droplet is divided into a main droplet and a satellite (sub droplet)

2. Description of the Related Art

As a result of the spread of information processing apparatus such as copying machines, word processors, and computers and also communication apparatus, inkjet printing apparatus are known as one type of output devices for printing images (information) from those apparatus. An inkjet printing apparatus forms an image by applying ink to a printing medium. Such an apparatus therefore employs a printing head formed by integrating and arranging a plurality of printing elements having an ink ejection opening and a liquid channel for supplying ink to the opening, and it is configured to eject ink from each of the printing elements according to a printing signal. Further, many apparatus having a plurality of rows of printing heads as described above to allow color printing are provided.

In an inkjet printing method dots are printed by placing ink in the form of flying droplets on a printing medium such as paper, the ink serving as a printing liquid. Such a system is advantageous in that it produces low noises because it is a non-contact system. An image can be printed in a higher resolution at a higher speed by integrating nozzles for ejecting ink in a higher density. Further, an image of high quality can be provided at a relatively low cost on a printing medium such as plain paper without any special process such as developing and fixing. In particular, on-demand type inkjet printing apparatuses are expected its promising future because such apparatuses can be easily adapted for color printing and can be made compact and simple.

In the field of such an inkjet printing apparatus, in particular, demand for higher speeds and higher quality is recently increasing. Under the circumstance, nozzle integrating and arranging techniques have advanced rapidly, and many long printing heads having a nozzle array in a high density have become available. As the density of nozzles increases, techniques for reducing the amount of ink ejected from each nozzle are pursued. Further, printing apparatus are provided, in which the gradation of an image is improved by adopting a technique for ejecting droplets in a plurality of sizes from a single nozzle and a configuration for providing a plurality of rows of nozzles for each size of droplet ejected. In order to achieve higher speeds, techniques are being developed for achieving a higher ejection frequency in ejecting ink from nozzles and for moving a carriage carrying a printing head at a higher speed accordingly.

When the ejecting condition of each nozzle of an inkjet printing head becomes unstable, an ink droplet ejected by one erecting operation can be divided into a main droplet and a sub droplet (satellite) smaller than the same. Since the main droplet and the satellite fly at different speeds generally, the two droplets ejected while the carriage is moved will be placed in different positions on a printing medium. In the case that the dot formed by the satellite is too noticeable, the image has a problem in that a dot is observed in a position having no relation with the image data. On the contrary, even when such a satellite is generated, if the satellite is sufficiently smaller in quantity than the main droplet or placed in a position that is very close to the dot formed by the main droplet, a resultant image will have no problem in most cases.

Various solutions to such a problem of a satellite have already been proposed, the solutions including, for example, limiting nozzles to be used for back and forth printing scans and printing contours of characters and graphics where the problem or a satellite is remarkable using nozzles different from those used for regions other than the contours. For example, such solutions are disclosed in Japanese Patent Application Laid-open Nos. 06-135126, 2001-129981, 2002-086764, or 2002-144608.

However, the recent advance toward smaller droplets described above has sometimes made the presence of a satellite more significant in deed, although a reduction in the size of main droplets provides the effect of reducing granularity of an image. When the moving speed of a carriage is increased, a main droplet and a satellite flying at different speeds are placed in positions at an increased distance from each other, which has also had the effect of making a satellite noticeable. The presence of such satellites generated in positions unrelated to image data can result in variation of the gradation of an image to make the rendering of densities unstable.

Further, in the case of a printing apparatus capable of ejecting droplets in a plurality of amounts, main droplets and satellites will form dots in various sizes at various distances from each other, and a situation can occur in which dots in various sizes exist in disorder. When the relationship between positions of placement of main droplets and satellite changes for some reason, various problems can occur in an image, including increased granularity of the image as a whole and generation of stripes or irregularities.

Under the recent circumstance where inkjet printing apparatus are required to achieve higher and-higher image quality, the presence of satellites and the influence of the same on an image is becoming again a serious problem that can be ignored.

SUMMARY OF THE INVENTION

The invention has been made to solve the above-described problem, and it is an object of the invention to mitigate problems it is an image attributable to satellites as far as possible in an inkjet printing apparatus that generates satellites.

An aspect of the present invention is an inkjet printing system employing a printing head having a plurality of printing elements for ejecting ink to form an image on a printing medium in a movement relative to the printing head, comprising: means for converting multi-valued image data into gradation value data at a lower level at a predetermined resolution; means for selecting, according to the gradation value data, an index pattern from among a plurality of index patterns whose areas each corresponding to one pixel of the printing resolution of the printing head are defined to be printed or not based on the gradation value data to render the density of a region corresponding to one pixel of the predetermined resolution using a plurality of such areas arranged in at least the moving direction; and means for ejecting the ink from the printing element toward the printing medium according to the index pattern selected by the selecting means, wherein the ink ejected from the printing element is divided into a main droplet and a sub droplet ejected pursuant to the main droplet, and wherein the number of the areas of the index pattern arranged in the direction of the movement is determined such that the main droplet and the sub droplet are printed on the printing medium at an interval that is substantially an integral multiple of the width of the region corresponding to one pixel of the predetermined resolution in the moving direction.

The above and other objects, effects, features and advantages of the present invention will become more apparent from the following description of embodiments thereof taken in conjunction with the accompanying drawings.

DESCRIPTION OF THE PREFERRED EMBODIMENTS

Embodiments of the invention will now be described in detail with reference to the drawings.

Figure 1:
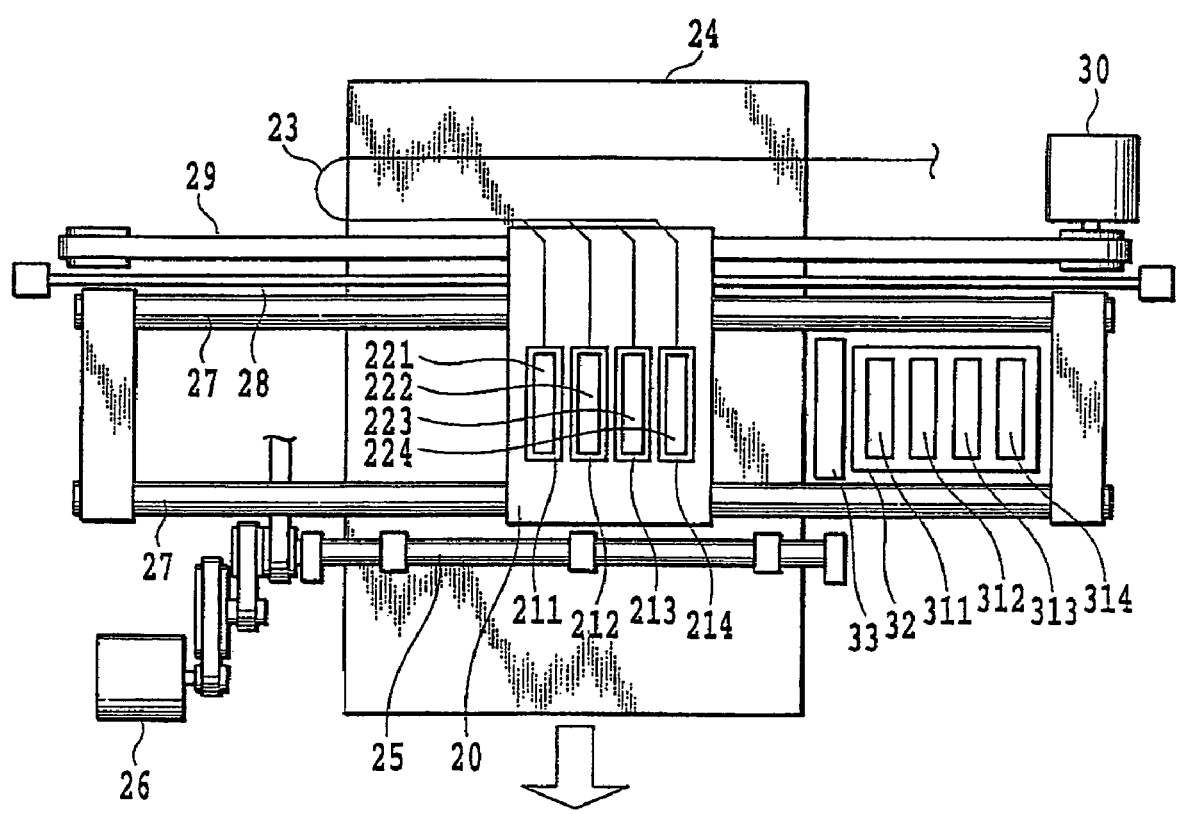
FIG. 1 is a top view showing a schematic configuration of an inkjet printing apparatus which is applicable for an embodiment of the invention.

FIG. 1 is a top view showing a schematic configuration of an inkjet printing apparatus which can be commonly used in the plurality of embodiments of the invention described below. A printing medium 24 which may be plain paper, high quality dedicated paper, OHP sheet, glossy paper, glossy film, or postcard is cliped by a discharge roller 25 after passing through a conveying roller which is not shown and conveyed in the direction of the arrow (sub-scanning direction) as driven by a conveying motor 26. A carriage 20 can be moved back and forth in the horizontal direction of the figure that is a main scanning direction through a drive belt 29 according as driven by a carriage motor 30. At this time, the carriage is guided and supported by a guide shaft 27 in the scanning direction, and the position of the same is controlled by a linear encoder 28.

The carriage 20 carries four inkjet printing heads (hereinafter also called printing heads) 211 to 214 associated with inks in four colors, i.e., black (K), cyan (C), magenta (M), and yellow (Y). A plurality of printing elements (nozzles) for ejecting ink is arranged on each of the printing heads 211 to 214. In the present mode, an electrothermal transducer is provided in a liquid channel of each printing element, and ink is ejected from the printing element by thermal energy generated by the electrothermal transducer. A printing signal is transferred to the printing heads 211 to 214 through a flexible cable 23, and each of the nozzles provided on the printing heads 211 to 214 ejects ink according to read timing of the linear encoder 28 based on the received printing signal. Reference numerals 221 to 224 represent ink cartridges for containing inks and supplying them to the printing heads 221 to 224, respectively.

That is, the inkjet printing apparatus of this embodiment is configured to form an image sequentially by intermittently repeating a printing operation of the printing heads 211 to 214 performed by moving them in the main scanning direction and an operation of conveying the printing medium in the direction of the arrow.

A recovery unit 32 having cap portions 311 to 314 associated with the printing heads 211 to 214, respectively, are disposed in a home position provided outside a printing area of printing heads 211 to 214. When printing heads 211 to 214 do not perform printing, the carriage 20 is moved to the home position where the ejection openings of the printing heads are capped with the caps 311 to 314. Thus, it is possible to suppress evaporation of an ink solvent through the ejection openings, and to prevent clogging attributable to ink retention to the neighborhood of the ejection openings and deposition of foreign substances such as dust. The caps 311 to 314 are also used for receiving ink which is ejected as occasion demands regardless of image data in order to eliminate an ejection failure or clogging at a printing element whose ejection frequency is low. Further, a nozzle having an ejection failure can be recovered by operating a pump, which is not shown, while the nozzle is capped to absorb the ink from the ejection opening.

Reference numeral 33 represents an ink receiving portion. The ink receiving portion is provided to receive ink ejected for a preparatory purpose when the printing heads 211 to 214 pass through the ink receiving portion 33 immediately before a printing scar. Although not shown, a blade or wiping member may be disposed in a position adjacent to the cap portions to clean the surfaces of the printing heads 211 to 214 where the ejection openings are provided.

Figure 2:
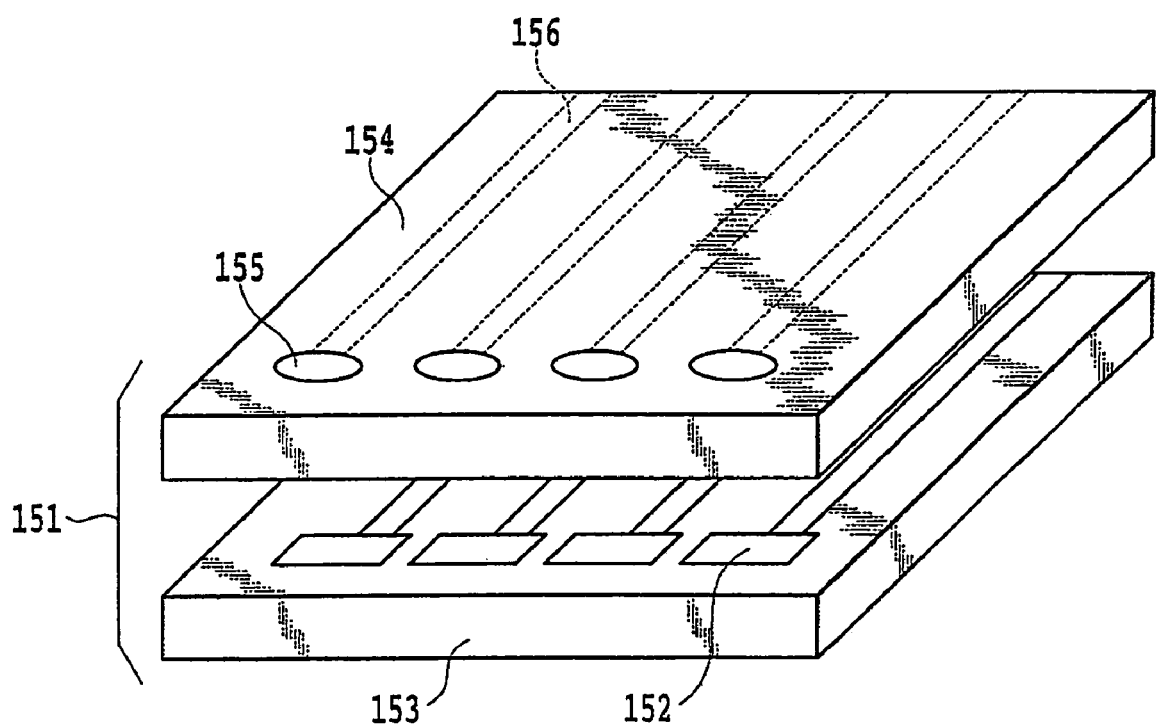
FIG. 2 is an enlarged view of a structure of a printing head used in the embodiment of the invention.

FIG. 2 is an enlarged view of a structure of a printing head used in an embodiment. Referring to the figure, a printing head 151 is schematically constituted by a heater board 153 formed with a plurality of electrothermal transducer elements (heaters) 152 for heating ink and a top plate 154 covering the heater board 153 from above. The top plate 154 is formed with a plurality of ejection openings 155 in positions associated with respective heaters 152 of the heater board 153, and a tunnel-like liquid channel 156 is formed behind each of the ejection openings 155 in communication therewith. Further, the liquid channels 156 are commonly connected to a single ink chamber provided behind thereof, and ink is supplied to the ink chamber from ink tanks for respective colors through ink supply holes. When a voltage is supplied to a heater 153 according to a printing signal, the heater abruptly generates heat to produce bubbles in the ink in contact with the same. A predetermined amount of ink is ejected in the form of droplets from the ejection openings 155 due to the energy of the growing bubbles. Although only four printing elements are shown, a greater number of printing elements are similarly formed on the heater board 153 and the top plate 154 in practice.

The inkjet printing system usable with the invention is not limited to the system utilizing heating elements (heaters) as described above. For example, it is possible to use a pressure control system in which in, droplets are ejected from orifices utilizing mechanical vibrations of piezoelectric vibration elements.

Figure 3:
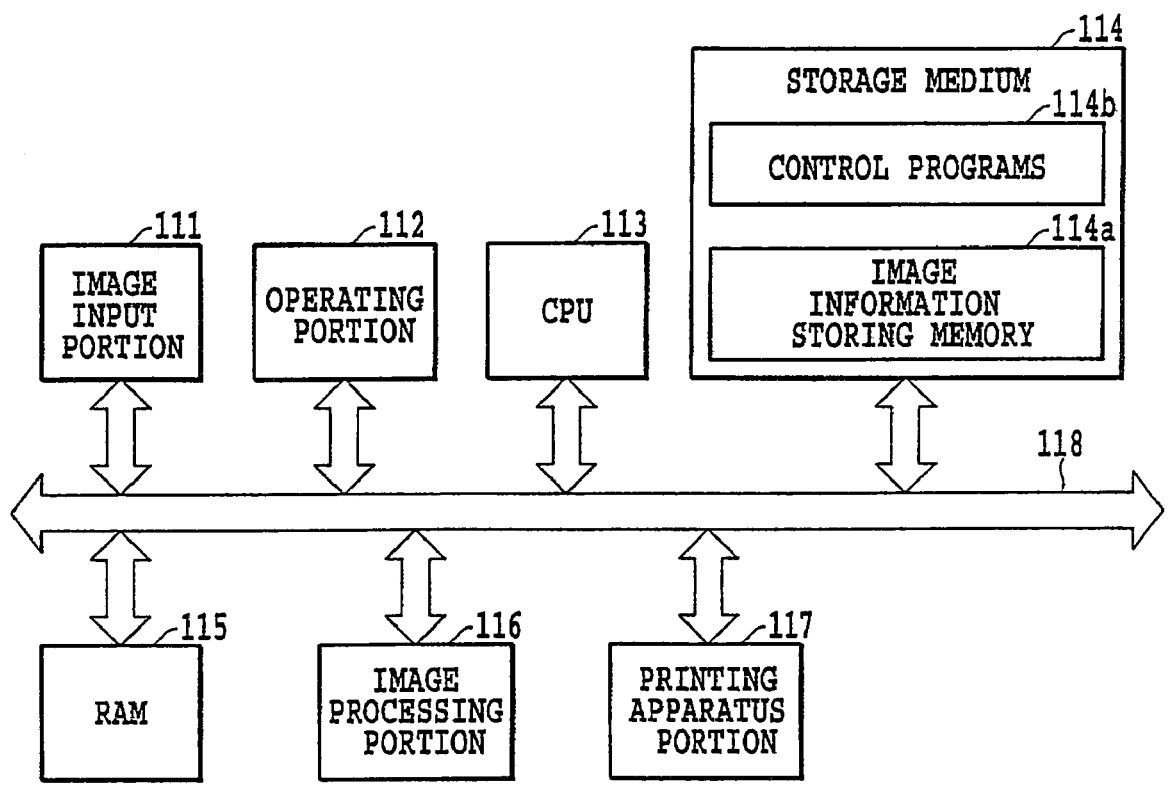
FIG. 3 is a block diagram for explaining a configuration of a control system of a printing system used in the embodiment of the invention.

FIG. 3 is a block diagram for explaining a configuration of a control system of a printing system including the inkjet printing apparatus described with reference to FIG. 1. In the figure, reference numeral 111 represents an image data input portion. The image data input portion 111 receives multi-valued image data from an image input apparatus such as a scanner or digital camera and multi-valued image data stored in a hard disk of a personal computer and inputs them to the printing apparatus. Reference numeral 112 represents an operating portion. The operating portion is provided with various keys for setting various parameters and instructing the commencement of a printing operation. Reference numeral 113 represents a CPU which performs various processes, the CPU controls the printing apparatus as a whole in accordance with various programs stored in a storage medium 114.

The storage medium 114 includes an image information storing memory 114a, and a group of control programs 114b. Dot placement information, information on types of printing media, information on ink, and information of environment such as temperature and humidity, and the like is stored in the image information storing memory 114a. Various control programs for the printing apparatus are stored as the group of control programs 114b. A ROM, FD™, CD-ROM, HD, memory card, or magneto-optical disk may be used as the storage medium 114.

Reference numeral 115 represents a RAM which is used as a work area when the various programs stored in the storage medium 114 are executed, a temporary save area at the time of error processing, or a work area at the time of image processing. The RAM 115 can be also used for temporarily copying various tables stored in the storage medium 114 and performing image processing at an image processing portion 116 while changing the contents of the tables.

Reference numeral 116 represents an image processing portion. The image processing portion 116 performs a series of image processes for converting a multi-valued image signal received by an image input part 111 into binary data which can be printed by each element of a printing apparatus portion 117. The image processes performed by the image processing portion 116 will be detailed later.

Reference numeral 117 represents a printing apparatus portion having a configuration as describe using FIG. 1. The image printing apparatus portion 117 ejects ink from a printing head for each color based on the binary printing data created by the image processing portion 116 to form dots on a printing medium. Reference numeral 118 represents a bus line for transmitting information such as address signals, data, and control signals within the system.

Figure 4:
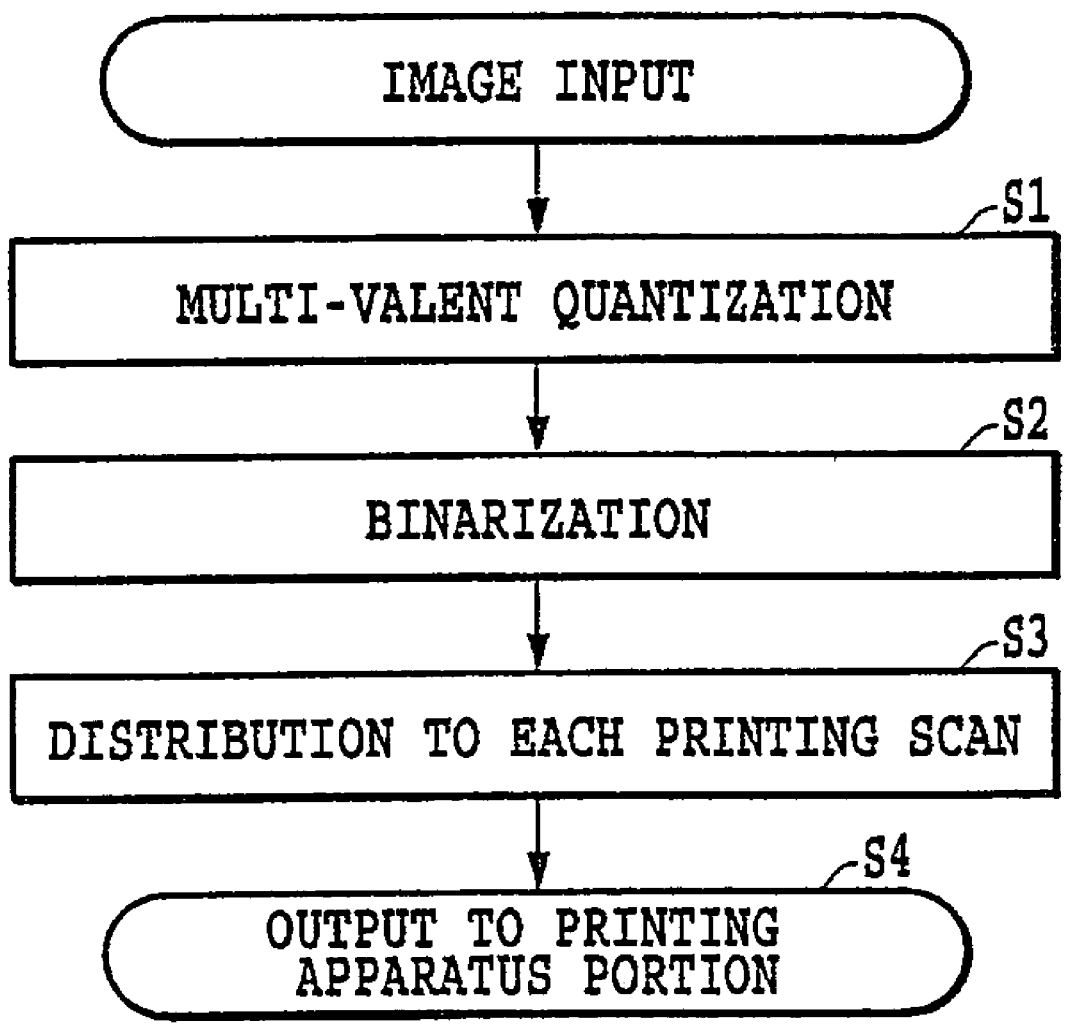
FIG. 4 is a flow chart for explaining steps of image processing performed by an image processing portion.

FIG. 4 is a flow chart for explaining steps of image processing performed by the image processing portion 116. The image input part 111 in this embodiment receives an 8-bit signal at a predetermined resolution in which each pixel has information in 256 gradations. The image processing portion 116 converts the 256-valued signal into a density signal K in smaller N gradations, which has a resolution of 300 ppi (pixels/inch) (Step 1). While multi-valued error diffusion may be used as the method of conversion, any method for processing halftones such as the average density preservation method and dither matrix method may alternatively be used. After converting the image data of each pixel into a density signal K in N gradations, the image processing portion 116 refers to a table stored in the image printing information storing memory 114a to convert the signal into an index pattern having 8 areas×8 areas associated with a density value K (Step 2).

Figure 5:
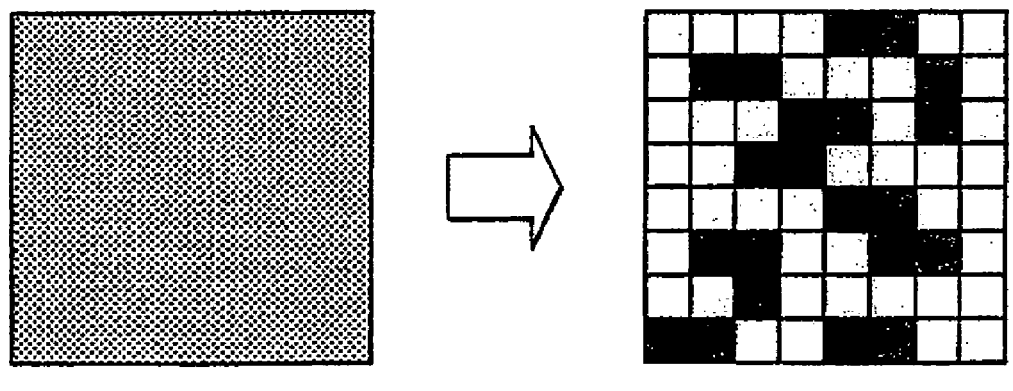
FIG. 5 is a schematic diagram showing an example of conversion of an index pattern.

FIG. 5 is a schematic illustration showing an example of conversion into an index pattern as described above. Each area included in the 8 areas×8 areas shown on the right side is equivalent to a region in which each printing head can print one dot at a printing resolution of 2400 dpi (dots/inch). The above-described index pattern is a binary pattern of arrangement in which areas where dots are to be printed (black areas) and areas where dots are not to be recoded (white areas) are defined according to the density value K among 64 gradations. For example, when the same gradation value K continues, the same dot arrangements according to the same index pattern appear consecutively.

When binary printing data associated with a printing resolution at the printing apparatus portion is thus created, the image processing portion 116 further performs AND operation of the data with a mask pattern that is prepared in advance to decide final binary data for ejection from the printing head at the next printing scan (Step 3).

The final binary data thus completed is transferred to the printing apparatus portion (Step 4).

The contents of a study that the inventors have made using the inkjet printing system described above will now be described. The inventors first investigated situations in which satellites are generated that the invention is to solve under various conditions.

Figure 6:
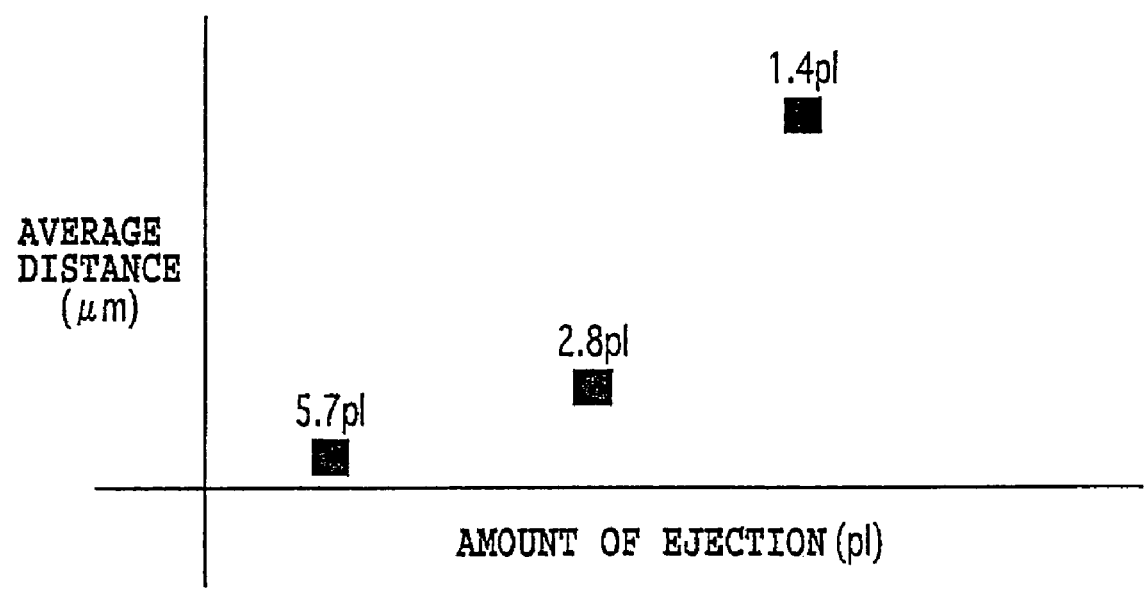
FIG. 6 shows a relationship between the amount of main droplets to be ejected and the distances between positions of placement of main droplets and satellites.

FIG. 6 shows a relationship between the amount of main droplets to be ejected and the distances between positions of placement of main droplets and satellites. In this study, dots were formed on a printing medium in three amounts of ejection, i.e., 5.7 pl, 2.8 pl, and 1.4 pl with the carriage moving speed at 25 inches/sec. and the distance between the ejection opening surface of the printing head and the printing medium fixed at 1.5 mm. An average distance between satellites generated and the main droplets is obtained and plotted on a graph for each amount of ejection. In the figure, the abscissa axis represents the amount of ejection which becomes smaller toward the right side. The ordinate axis represents average values the distance between main droplets and satellites. The figure indicates that the average distance between main droplets and satellites is greater, the smaller the amount of ejection.

Figure 7:
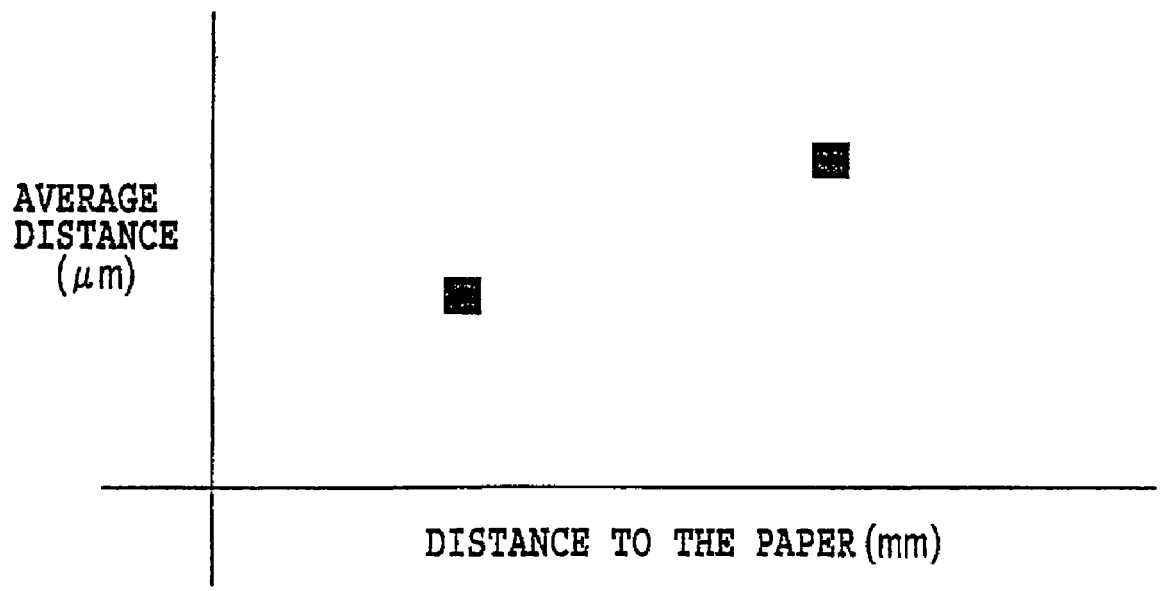
FIG. 7 shows a relationship between the distance to the paper and the distance between the positions of placement of main droplets and satellites.

FIG. 7 shows a relationship between main droplets and satellites in terms of the distance between the positions of placement thereof when the distance to the paper is varied with the carriage moving speed and the amount of ejection fixed. The figure indicates that the average distance between main droplets and satellite is greater, the greater the distance to the paper. It is known that main droplets and satellites have substantially the same component of velocity in the moving direction of the carriage at the time of ejection whereas main droplets have a greater component of velocity in the direction of the printing medium. Since the time difference between the placements of the droplets therefore becomes greater as the distance to the paper increases, the distance between the positions of placements consequently increases in the moving direction of the carriage.

Figure 8:
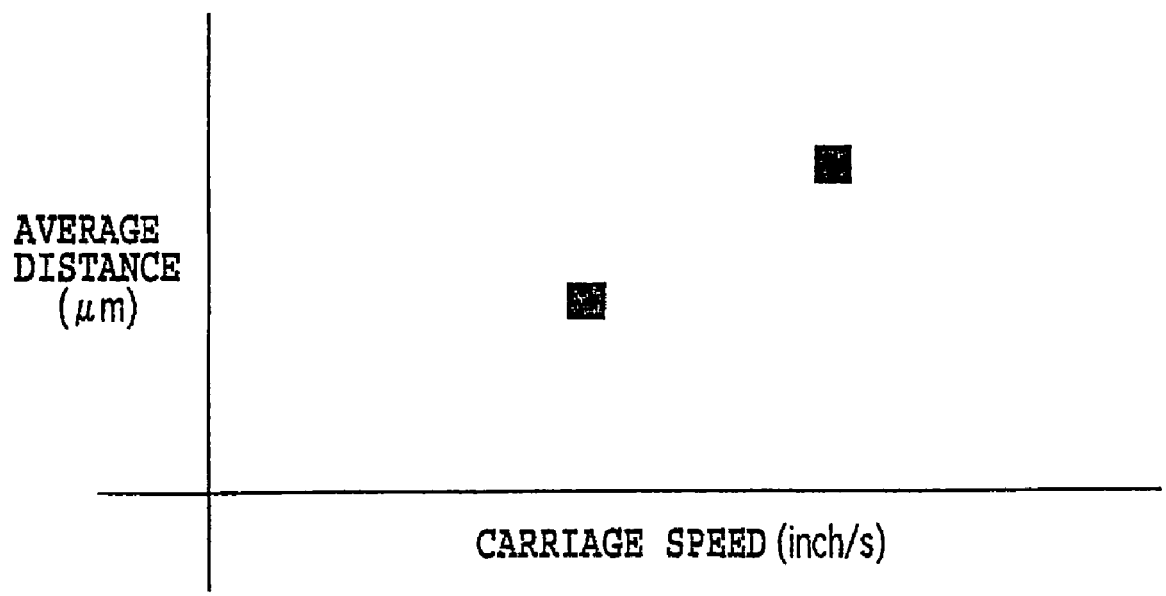
FIG. 8 shows a relationship between the roving speed of a carriage and the distance between the positions of placement of main droplets and satellites.

FIG. 8 shows a relationship between main droplets and satellites in terms of the distance between the positions of placements thereof when the carriage moving speed is varied with the distance to the paper and the amount of ejection fixed. The figure indicates that the average distance between main droplets and satellites is greater, the higher the carriage moving speed. Since main droplets and satellites have different components of velocity in the direction of the printing medium just as shown in FIG. 7, the distance between the positions of placement increases in the carriage moving direction, the higher the carriage moving speed.

Figure 9:
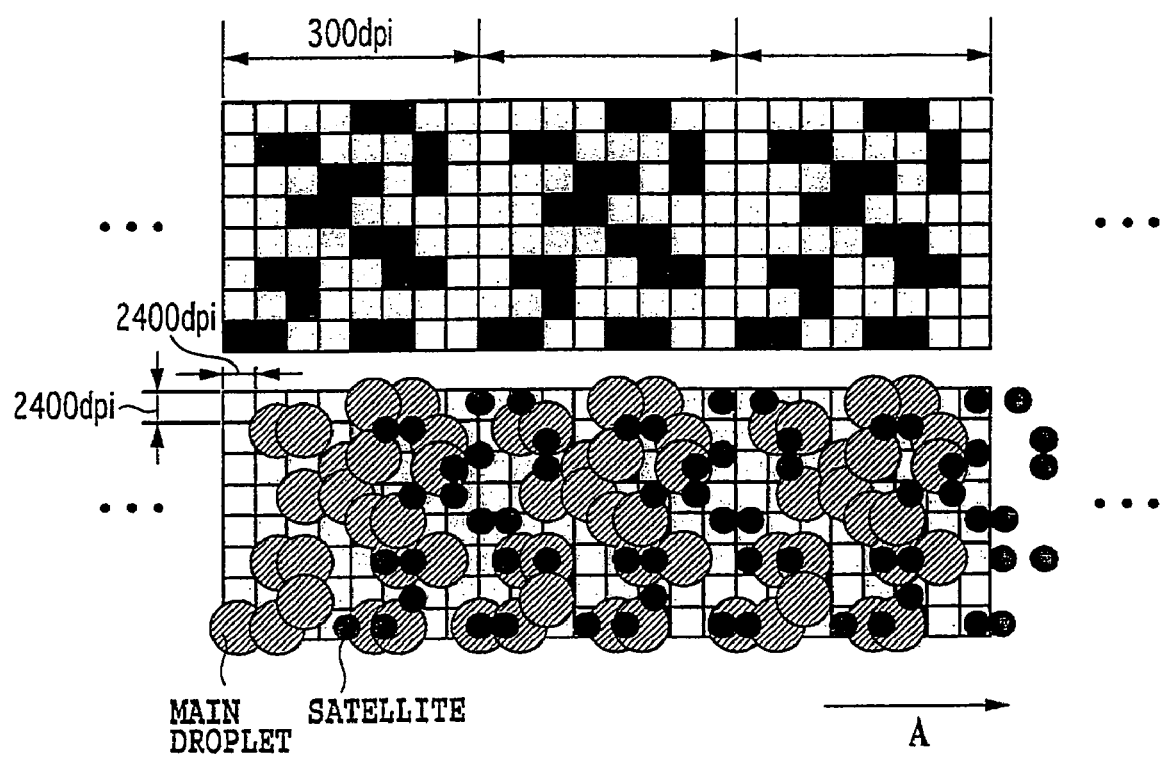
FIG. 9 is a schematic view showing a state of dot placement when the index pattern shown in FIG. 5 is printed consecutively.

FIG. 9 is a schematic view showing a state of dot placement when satellites as described above are generated in the case in which an index pattern as shown in FIG. 5 is consecutively printed. In the figure, each area has a density of 2400 dpi, or one area is a square of about 10.6 μm. The carriage moves in the direction indicated by the arrow A, and satellites reaching the printing medium at delayed timing are placed in positions shifted from the main droplets in the direction A. A situation is shown here, in which the distance between the main droplets and the satellites is about 32 μm.

When satellites are placed at a great shift from the main droplets as shown, dots can be formed in blank areas which should be placed by no dot. In this case, since the size of the dots formed by satellites is not negligibly small in comparison to that of main droplets, the density value to be rendered by each pixel (8 areas×8 areas) will be rendered differently from the gradation value K. Further, since it becomes difficult to render the contours of dots which should be formed by main droplets, the resultant image may have low sharpness. Furthermore, the positions of placement and size of such satellites are easily affected by the vibration of the carriage during scanning and the ejecting performance of the printing head. So, the output image will be very unstable in that the gradation value can vary each time printing is performed and it that granularity and stripes and irregularities can be suddenly generated.

After a close examination, however, the inventors have found that the appearance of such satellites has not so significant influence on image quality as long as the amount of the shift from the main droplets satisfy a predetermined condition. Specifically, when the average distance between main droplets and satellites is an integral multiple of the width of the index pattern in the main scanning direction, the resultant condition will be similar to a case wherein main droplets and satellites are placed with little interval between them. It was thus found that influence on an image as described above can be reduced.

For example, a discussion will now be made on an assumption that the main scanning width of the index pattern in the example in FIG. 9 that is equivalent to eight areas or about 85 μm is changed to about 32 μm which is the average distance between main droplets and satellites. In this case, since a satellite shifted from the main droplet is highly likely to overlap another main droplet of the index pattern of an adjacent pixel, the problem caused by dot placement on blank areas is suppressed.

Figure 10A:
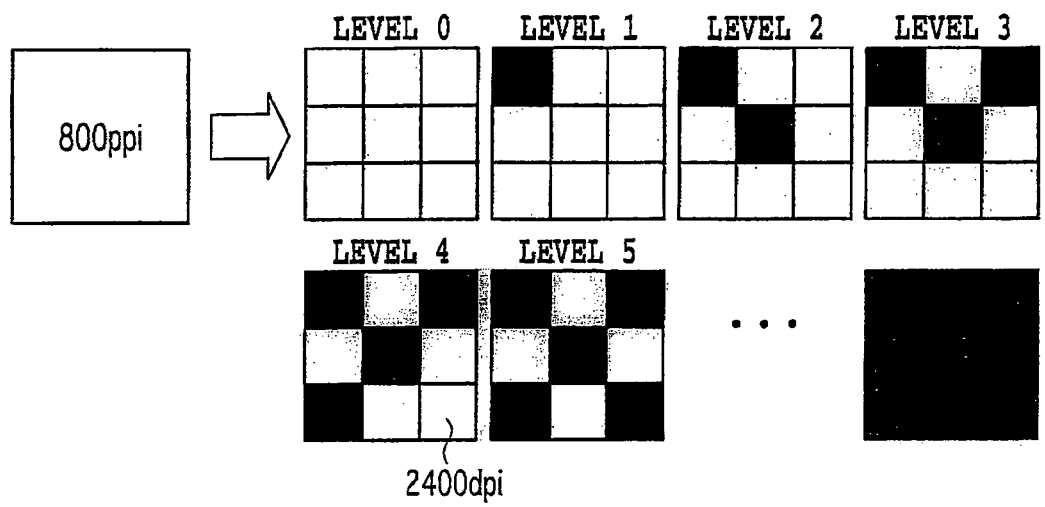
FIGS. 10A to 10C are schematic views showing index patterns and states of dots placed when the width of the index pattern is 32 μm.
Figure 10B:
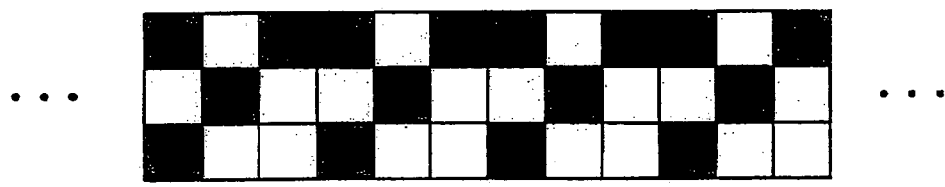
Figure 10C:
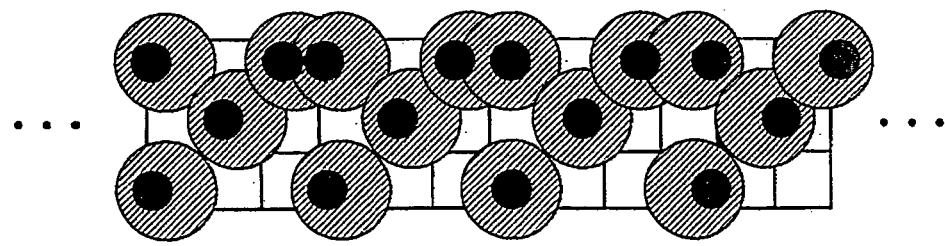

FIGS. 10A to 10C are schematic views showing index patterns and states of dot placement when the width of the index patterns is set at 32 μm. When an index pattern as shown in FIG. 10A is used, the image processing portion 116 performed the process at Step 1 to convert 256-valued image data input at a pixel density of 300 ppi into decadic values of 800 ppi. Further, at Step 2, the multi-valued data obtained at Step 1 is converted into binary data that is rendered by printing and not printing 3 areas×3 areas.

FIG. 10A shows an example of an index pattern having 3 areas×3 areas converted according to levels (0 to 9) of one pixel which are rendered by decadic values of 800 ppi. It will be understood that the number of printed areas increments as the level increases.

FIG. 10B shows an example of an arrangement of an index pattern in a case in which consecutive pixels having a level value of 4 exist. When there is a uniform spread of a certain density, a predetermined index pattern repeats as shown.

FIG. 10C shows a situation in which dots are printed in practice according to the index pattern shown in FIG. 10B. Satellites are placed in positions about 32 μm apart from main droplets just as in FIG. 9. However, main droplets in the same area of an adjacent pixel are placed in those positions, and the satellites overlap them. Specifically, since the satellites are not placed independently in areas which must be blank as shown in FIG. 9, it can be expected that various potential problems attributable to dots formed by the satellites will be mitigated.

First Embodiment

Specific embodiments of the invention will now be described based on the results of the above-described studies.

Figure 11:
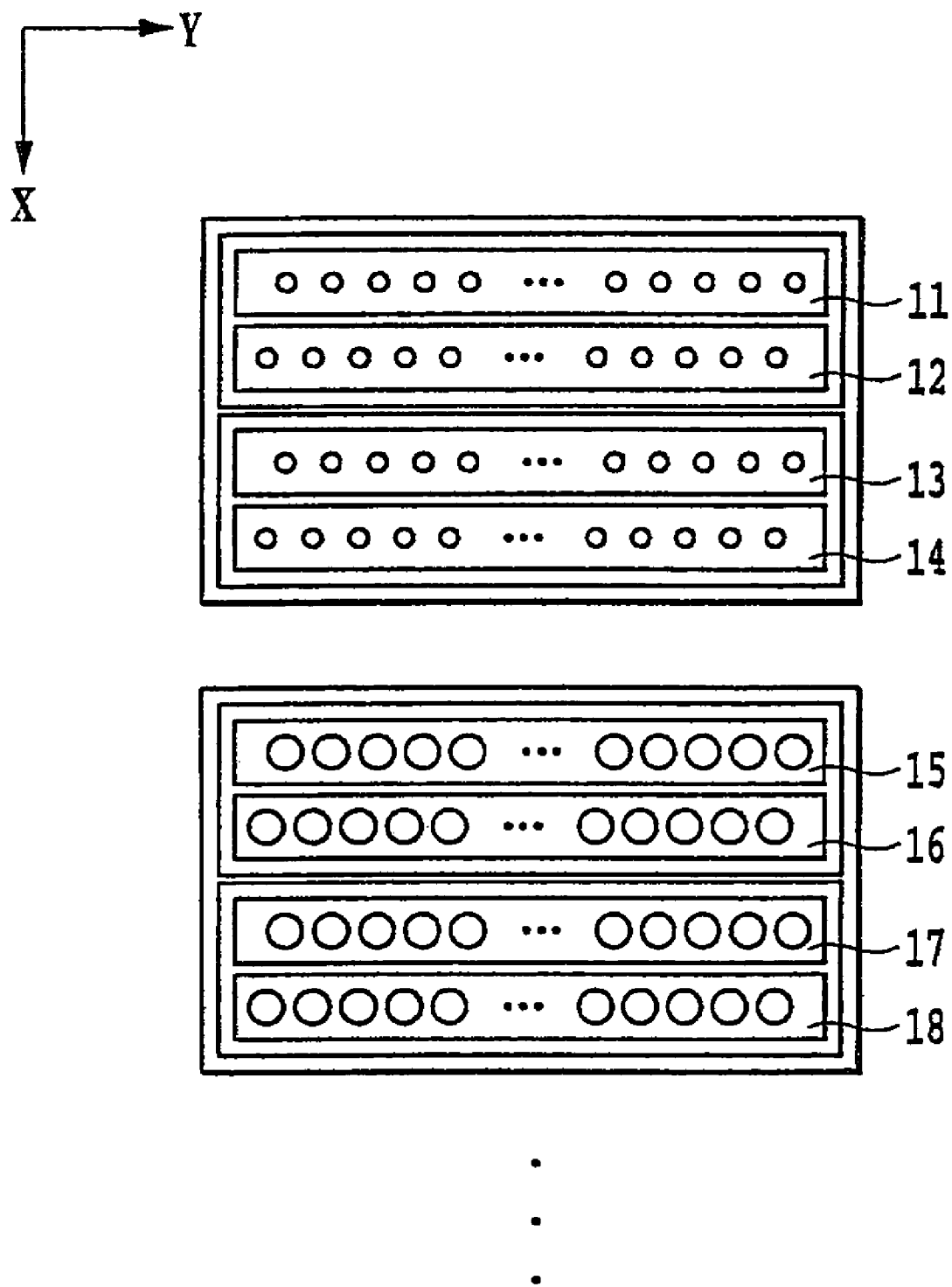
FIG. 11 is a schematic view showing an arrangement of ejection openings of a printing head used in the embodiment of the invention.

FIG. 11 is a schematic illustration showing an arrangement of ejection openings of a printing head used in this embodiment. In the figure, reference numerals 11 to 14 represent rows of ejection openings for ejecting ink droplets of about 1.5 pl. In each row of ejection openings, 256 openings are arranged at a pitch of 600 dpi in a Y-direction. Reference numerals 11 to 14 represents rows of ejection openings ejecting ink in the same color, and each rows is disposed at an offset of about ¼ of the pitch in the Y-direction. Specifically, 1024 dots can be printed at a resolution of 2400 dpi in the Y-direction by ejecting ink from each ejection opening while moving and scanning the printing head 10 in an X-direction. Reference numerals 15 to 18 represent rows of ejection openings for ejecting ink droplets of about 2.8 pl. The rows of ejection openings 15 to 16 are disposed similarly to the rows of ejection openings 11 to 14 to allow 1024 dots to be printed at a resolution of 2400 dpi. That is, the printing head is capable of printing large and small dots in the same color at a resolution of 2400 dpi using the rows of eject on openings 11 to 18.

In the case of a printing head capable of ejecting ink in plural steps of amounts, the distance between the positions of placement of main droplets and satellites does not have a single fixed value as described with reference to FIG. 6. In this case, a printing scan for large dots and a printing scan for small dots may be performed independently of each other at different carriage speeds utilizing the phenomenon described with reference to FIG. 8. In such a configuration, however, the number of printing scans is doubled to create a new problem in that the printing time is increased. In this embodiment, therefore, different methods of multivalent quantization and index patterns are used for large dots and small dots in order to accommodate two different distances between positions of placement. This embodiment is based on an assumption that the distance between positions of placement of small dots (1.5 pl) is about 63 µm and the distance between positions of placement of large dots (2.8 pl) is about 32 µm where the distance to the paper is 1.2 mm and the carriage speed is 25 inches/sec.

Figure 12:
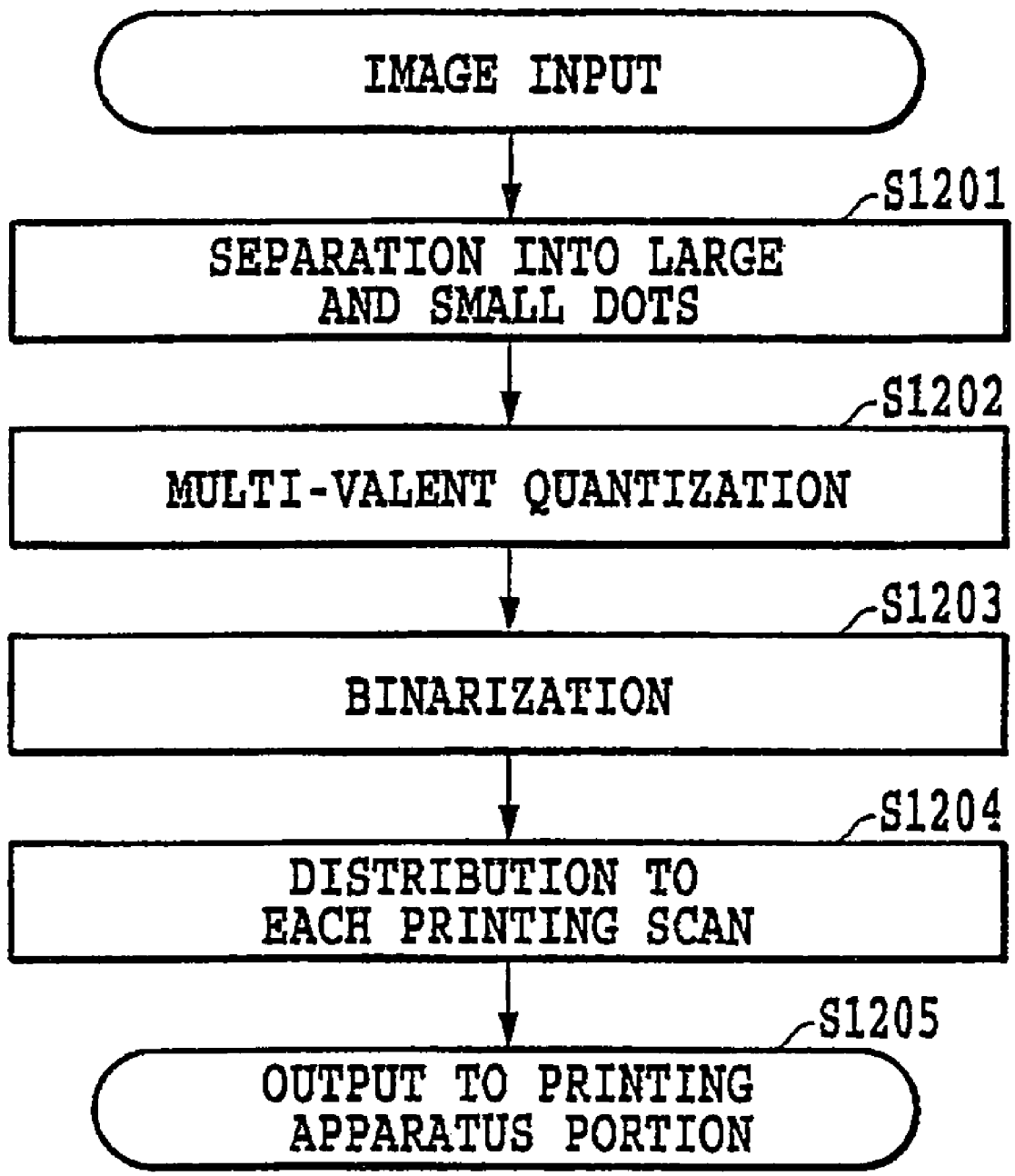
FIG. 12 is a flow chart for explaining the flow of the image processing in the embodiment of the invention.

FIG. 12 is a flow chart for explaining the flow of image processing in this embodiment. First, at Step 1201, data in 256 gradations of each pixel is divided into data of small dots (1.5 pl) and data of large dots (2.8 pl).

Figure 13:
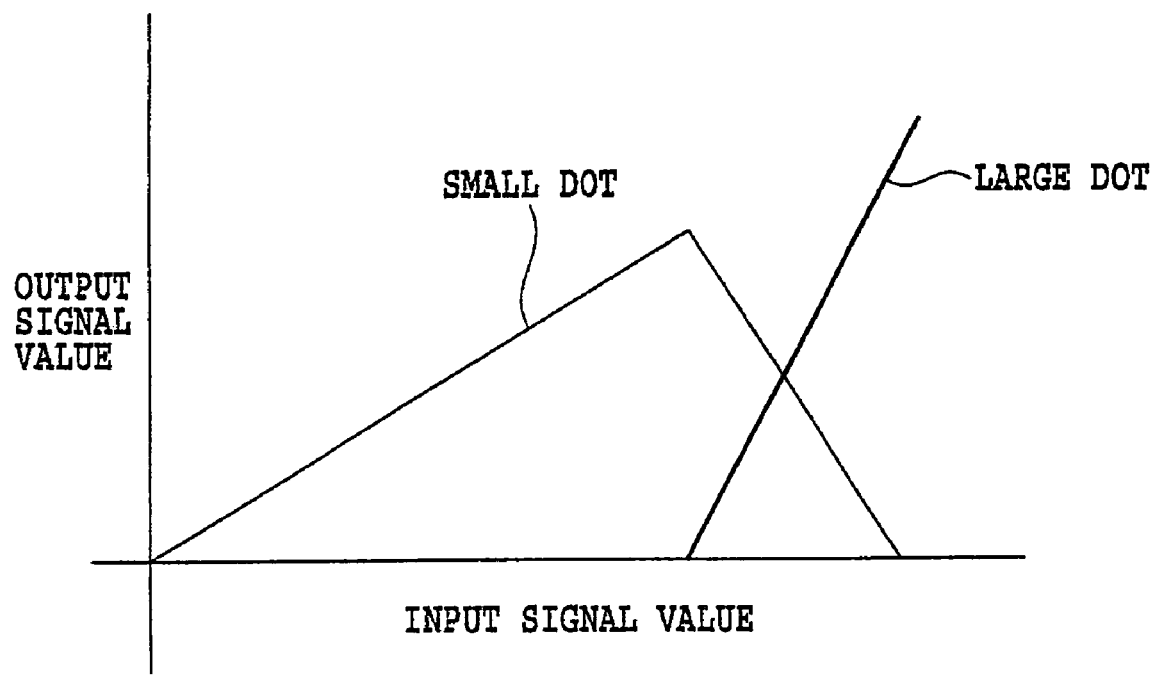
FIG. 13 is a graph for explaining how a signal value is converted to divide for large and small droplets.

FIG. 13 is a graph showing how a signal value is converted to divide it into large and small dots, which is carried out in Step 1201. In the figure, the abscissa axis represents an input signal in 256 gradations. The ordinate axis represents output signal as large and small dots, respectively. Small dots are primarily used in the range from the region where the input signal value is small up to an intermediate density, and the signal value for the large dots increases beyond the neighborhood of a predetermined density. Such a mode of signal value conversion is advantageous in that density can be efficiently increased in a high density region while granularity in a highlight portion is suppressed.

When such separation of large and small dots at Step 1201 is completed, the large dots and the small dots are processed independently of each other from the subsequent step. First, at step 1202, data in 256 gradations of 300 ppi is quantized into data in 10 gradations of 800 ppi for the large dots. Data in 256 gradations of 300 ppi is quantized into data in 37 gradations of 400 ppi for the small dots.

At subsequent Step 1203, the data for the large dots is converted into binary data using an index pattern having 3 areas×3 areas as described with referenced to FIG. 10. The data for the small dots is converted into binary data using an index pattern having 6 areas×6 areas.

This embodiment employs multi-pass printing at four passes. At Step 1204, therefore, AND operation is performed between a mask pattern having a printing rate of about 25% and the binary pattern output at Step 1203 for each of the large and small dots to decide the dots to be actually printed during each scan for printing. The binary information finally decided is transferred to the printing apparatus portion (Step 1205).

Figure 14A:
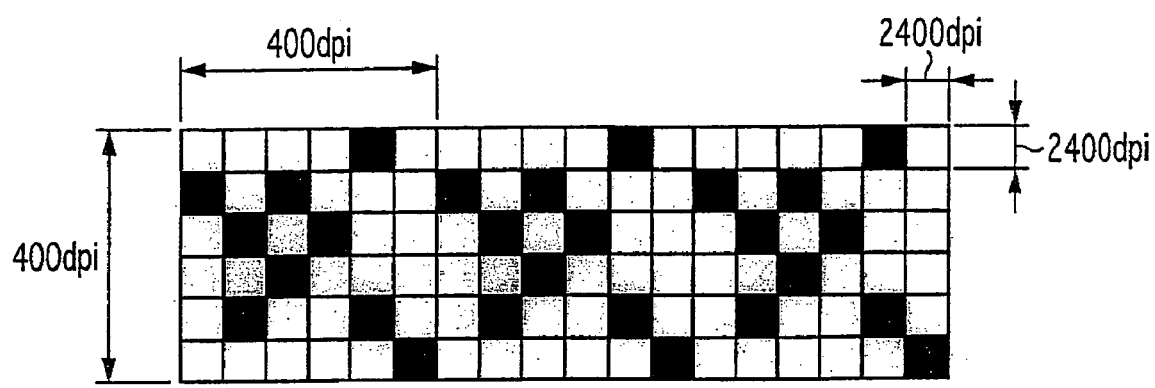
FIGS. 14A to 14C are schematic views showing an example of an index pattern used in the embodiment of the invention and dot placement during printing performed according to the same.
Figure 14B:
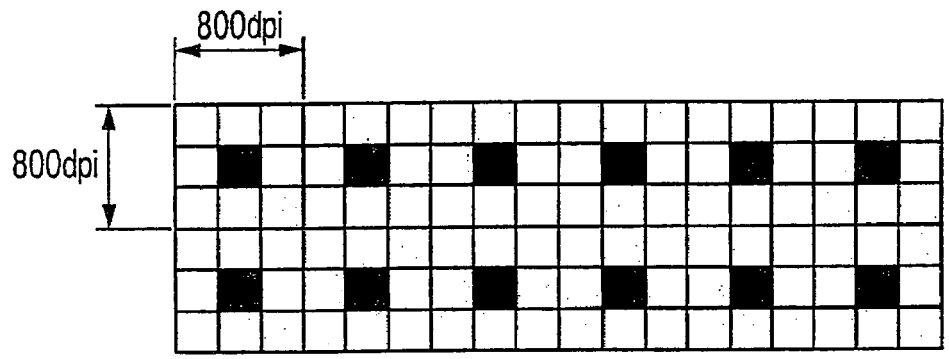
Figure 14C:
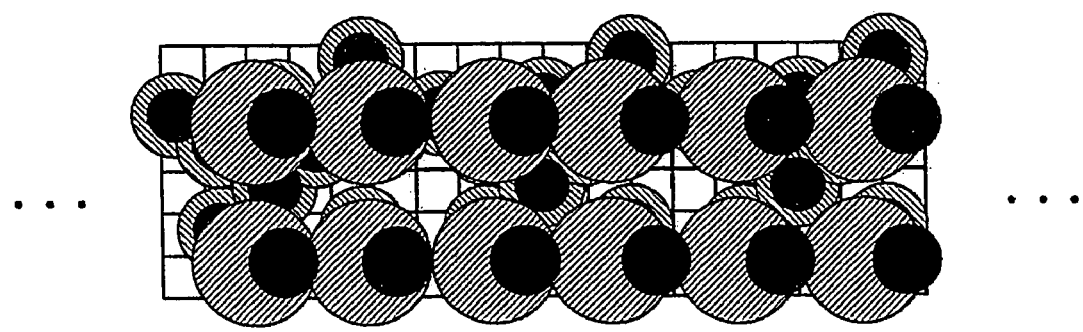

FIGS. 14A to 14C are schematic views showing examples of index patterns used in this embodiment and a state of dot placement during printing performed according to the index patterns. FIG. 14A shows an index pattern, or small dots. Patterns in which nine areas among 6 areas×6 areas are printed are arranged to support three pixels. FIG. 14B shows an index pattern for large dots. Patterns in which one area among 3 areas×3 areas is printed are arranged to support six pixels. FIG. 14C shows states of placement of main droplets and satellites when dots are actually printed according to the respective index patterns. The distance between the positions of placement is different among the large dots and small dots, but each satellite is printed in an overlapping relationship with a main dot in an adjoining pixel. Therefore, since no satellite is placed in a region which must be blank, various potential problems attributable to dots formed by satellites can be mitigated.

Second Embodiment

A second embodiment of the invention will now be described. This embodiment is also based on an assumption that multi-pass printing at four passes is performed to form an image using a printing apparatus and a printing head similar to those in the first embodiment. In this embodiment, however, it is assumed that the distance between positions of placement is about 42 µm for small dots (1.5 pl) and the distance between positions of placement is about 5 µm for large dots (2.8 pl) where the distance to the paper during printing is 1.0 mm and the carriage speed is 25 inches/sec. As a result, a main droplet and a satellite of a large dot placed substantially in the same position. In this embodiment, therefore, an index pattern corresponding to a resolution of 600 dpi is used for both of large and small dots. Specifically, data in 256 gradations of 300 ppi is quantized into data in 16 gradations of 600 dpi for both of the large and small dots at a quantization step. At a subsequent binarization step, the data is converted into binary data using an index pattern having 4 areas×4 areas. This embodiment is characterized by the arrangement of areas of the index pattern which are decided to be printed or not.

Figure 15A:
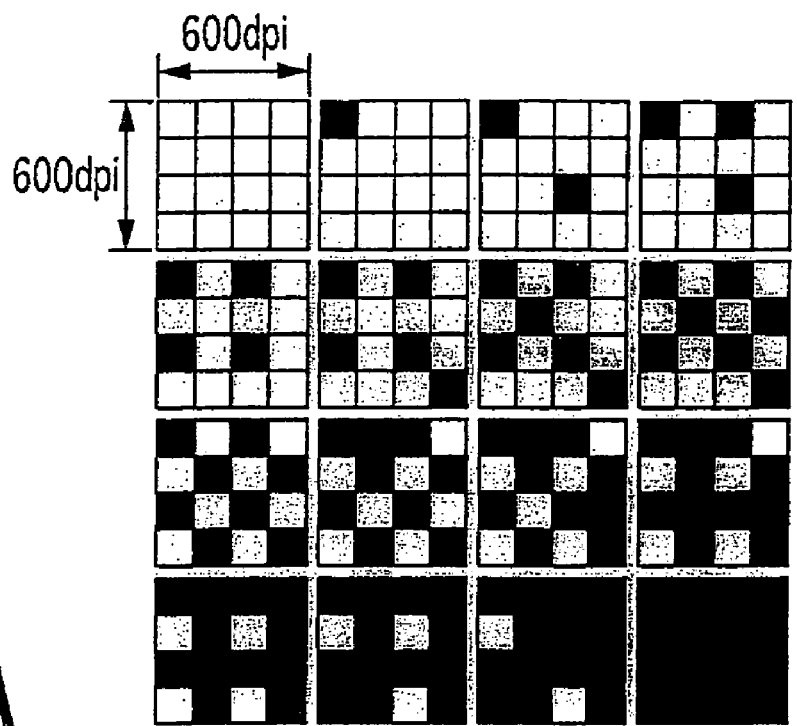
FIGS. 15A and 15B are schematic views for explaining characteristics of an index pattern of a second embodiment of the invention.
Figure 15B:
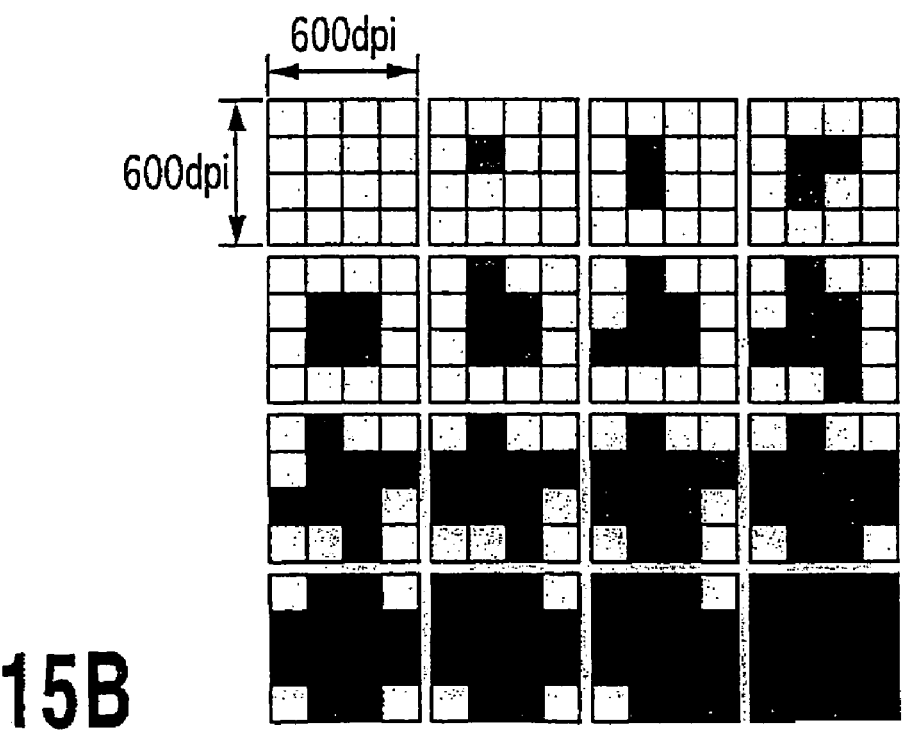

FIGS. 15A and 15B are schematic illustrations for explaining the characteristics of the index pattern of this embodiment. FIGS. 15A and 15B are the same in that the number of areas to be printed increments as the level of the pixel increases. However, the printed areas in FIG. 15A are relatively distributed for each gradation, whereas the printed areas in FIG. 15B are kept concentrated. In this embodiment, the index pattern shown in FIG. 15B is used.

Figure 16A:
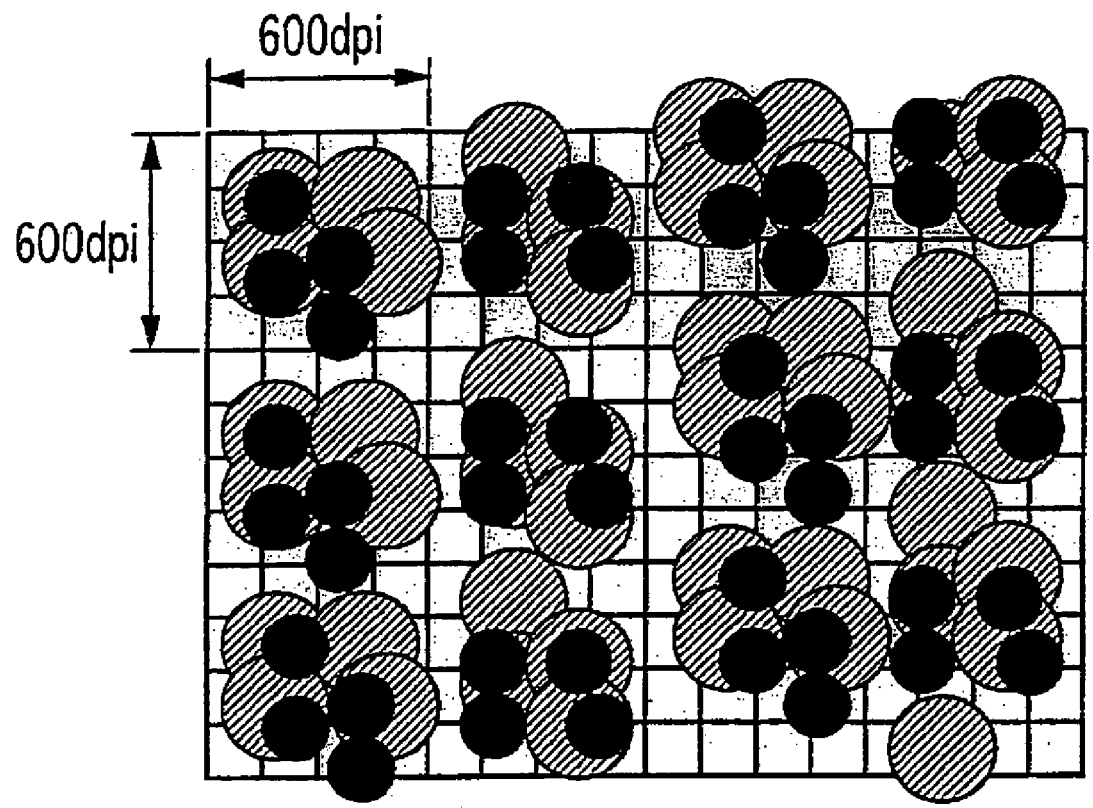
FIGS. 16A and 16B are schematic views showing the placement of dot ejected according to the index pattern shown in FIG. 15A
Figure 16B:
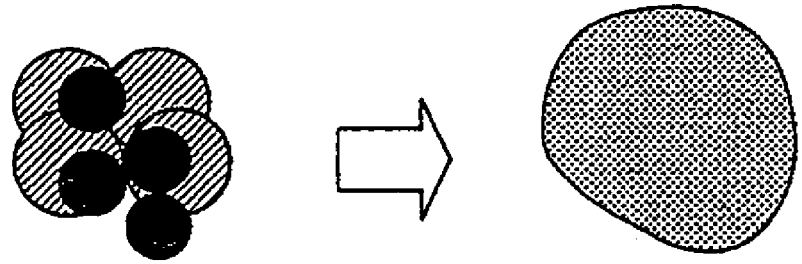

FIGS. 16A and 16B are schematic illustrations showing states of placement of dots ejected according to index pattern shown in FIG. 15B. In this embodiment, as shown in FIG. 16A, a satellite placed in a position shifted from the main droplet is not only in an overlapping relationship with a main droplet in the same position of an adjoining pixel but also surrounded by a group of main droplets that concentrate in the vicinity of the main droplet. In such a case, even if the position of a satellite deviates from the average position, the satellite is likely to be kept in the state in which it is absorbed in the group of dots formed by a plurality of main droplets. That is, as shown in FIG. 16B, even if there is some deviation of the position of a satellite or a group of satellites, no significant effect appears on the shape of a large dot that is finally formed.

Such an advantage of this embodiment can be achieved regardless of the printing medium, i.e., on either plain paper such as PPC paper or dedicated paper which absorbs ink at a high speed. The effect of improving image quality is significant especially on a printing medium such as glossy paper which has a relatively low absorbing speed and on which the contour of a dot appears clearly.

Since dots of a dot aggregate intentionally formed in this embodiment do not spread in disorder, a region of paper can be easily kept blank. As a result, there is another advantage in that the gradation in a region of high densities can be consequently maintained.

Third Embodiment

A third embodiment of the invention will now be described. This embodiment is also based on an assumption that multi-pass printing at four passes is performed to form an image using a printing apparatus and a printing head similar to those in the above-described embodiments. This embodiment is a mode for printing on, in particular, thick paper or printing media which are likely to curl. The distance to the paper is increased to 1.5 mm from that in the second embodiment. When printing is performed with the carriage speed kept at 25 inches/sec. in this state, the distance between positions of placement of small dots (1.5 pl) is about 85 µm, and the distance between the positions of placement of large dots (2.8pl) is about 42 µm. As a result, a preferable image cannot be output using the method of image processing and index pattern used in the second embodiment.

In this case, an image process dedicated to the present mode may be prepared as in the above-described embodiment. For small dots, image processing at 300 dpi can be performed using an index pattern having 8 areas×8 areas. Large dots may be processed using the index pattern having 4 areas×4 areas used for small dots in the second embodiment. However, the use of the index pattern having 8 areas×8 areas means that a pattern to accommodate 64 gradations is to be prepared, which necessitates a large memory to implement the present mode for thick paper.

Under the circumstance, in this embodiment, patters appropriate for large dots and small dots respectively are selected from among existing index patterns instead of providing a new index pattern for the present mode. The scanning speed of the carriage is adjusted such that the distance of positions of placement substantially equals an integral multiple of the size of each index pattern. The object of the invention is achieved through two approaches described above. The advantage of the invention can be achieved if the distance between positions of placement of main droplets and satellites is an integral multiple of the width of an index pattern that is used. Therefore, any of the distance to paper, carriage speed, or the size of the index pattern may be adjusted as means for achieving the advantage.

In the above-described embodiments, each parameter is adjusted such that the distance between positions of placement of main droplets and satellites becomes an integral multiple of the index pattern used. The advantage of the invention can be anticipated to some extent even if the distance is not adjusted to an integral multiple. However, it is preferable to satisfy the condition of setting the distance at such an integral multiple because moire may otherwise be generated on a resultant image.

Since a configuration is employed in which printing is performed on the same scanning using droplets in plural steps of amounts including main droplets and satellites placed at different intervals, it is a desirable design practice to adjust the sizes of the droplets, the solid-state properties of ink, and printing speed such that the plurality of distances between positions of placement become an integral multiple respectively.

Although the above embodiments have been described with reference to the printing head shown in FIG. 11, it is obvious that such printing heads are prepared to accommodate a plurality of colors, and a configuration may be employed in which independent index pattern and image process are prepared for each ink color. Further, the invention is not limited to inks in four colors as described with reference to FIG. 1, and the advantage of the invention does not change at all even in a mode in which inks in red, blue, and green are prepared or in which a light-colored ink using a coloring material of a low density is prepared for each color.

In any of the above-described three embodiments, multi-pass printing at four passes is performed using a serial printing apparatus. It is obvious that the invention is not limited to such a mode of implementation. The advantage of the invention can be also achieved when a greater number of the multi-passes are set, when printing is performed with the 1-pass printing is performed, or when the interlace printing method is employed.

Further, the invention can be advantageously applied to a full-line type printing head which has a length equivalent to the maximum width of printing media that can be printed by a printing apparatus. Such a printing head may be configured such that the required length is achieved by combining a plurality of such printing heads. It may alternatively be configured as a single printing head formed as an integral unit. In the case of a full-line type printing head, the conveying speed of a printing medium is a factor corresponding to the carriage speed in the above-described embodiments.

The above embodiments have been described as such printing systems that data conversion associated with image processing is mostly performed by the image processing portion 116 provided externally to the printing apparatus portion 117 as described with reference to the block diagram in FIG. 3. However, the invention is not limited to such a configuration, and a configuration may alternatively be employed in which a part or all of the steps shown in FIGS. 4 and 12 are performed in the printing apparatus portion. The scope of the invention covers printing systems such as copying machines and facsimile machines which include all features as described above in the machines themselves.

Further, the inventive inkjet printing head is not limited to the configuration including electrothermal transducers as described with reference to FIG. 2. The configuration of the invention advantageously works in other types of systems such as piezoelectric systems and electrostatic systems as long as they are printing systems in which a droplet is divided into a main droplet and a satellite. However, the configuration described in FIG. 2 may be regarded effective especially in an inkjet printing system in that it allows a cost reduction and high definition to be relatively easily achieved.

The present invention has been described in detail with respect to preferred embodiments, and it will now be apparent from the foregoing to those skilled in the art that changes and modifications may be made without departing from the invention in its broader aspect, and it is the intention, therefore, in the appended claims to cover all such changes and modifications as fall within the true spirit of the invention.

This application claims priority from Japanese Patent Application No. 2004-361849 filed Dec. 14, 2004, which is hereby incorporated by reference herein.

What is claimed is:

1. An inkjet printing system employing a printing head having a plurality of printing elements for ejecting ink to form an image on a printing medium in a movement relative to the printing head, comprising:

means for converting multi-valued image data into gradation value data at a lower level at a predetermined resolution;

means for selecting, according to the gradation value data, an index pattern from among a plurality of index patterns whose areas each corresponding to one pixel of the printing resolution of the printing head are defined to be printed or not based on the gradation value data to render the density of a region corresponding to one pixel of the predetermined resolution using a plurality of such areas arranged in at least the moving direction; and means for ejecting the ink from the printing element toward the printing medium according to the index pattern selected by the selecting means, wherein the ink ejected from the printing element is divided into a main droplet and a sub droplet ejected pursuant to the main droplet, and wherein the number of the areas of the index pattern arranged in the direction of the movement is determined such that the main droplet and the sub droplet are printed on the printing medium at an interval that is substantially an integral multiple of the width of the region corresponding to one pixel of the predetermined resolution in the moving direction.

2. An inkjet printing system according to claim 1, wherein the printing head includes a plurality of rows of printing elements for ejecting ink in different amounts and wherein the number of the areas of the index pattern arranged in the moving direction is different for each of the plurality of rows of printing elements.

3. An inkjet printing system according to claim 2, wherein the number of the areas of the index pattern arranged in the moving direction is smaller for a row of printing elements ejecting ink in a relatively large amount than for a row of printing elements ejecting ink in a relatively small amount.

4. An inkjet printing system according to claim 1, wherein the index pattern is defined such that the number of areas where a dot is to be printed increases from an inner side of the index pattern to an outer side of the same, the greater the value of the gradation value data becomes.

5. An inkjet printing system according to claim 1, wherein an image is formed by intermittently repeating a printing main scan for moving and scanning the printing head relative to the printing medium while ejecting ink from the printing element and a sub scan for conveying the printing medium in a direction across the direction of the printing main scan.

6. An inkjet printing system according to claim 1, wherein the printing head comprises a plurality of the printing elements arranged over a printing width of the printing medium and wherein an image is formed by conveying the printing medium in a direction across the direction in which the printing elements are arranged while ejecting ink from the printing elements.

7. An inkjet printing system according to claim 1, wherein the printing element ejects ink utilizing thermal energy generated by an electrothermal transducer element provided therein.

* * * * *

UNITED STATES PATENT AND TRADEMARK OFFICE
CERTIFICATE OF CORRECTION

PATENT NO.        : 7,322,665 B2                                        Page 1 of 1
APPLICATION NO.   : 11/296279
DATED             : January 29, 2008
INVENTOR(S)       : Tsuyoshi Shibata et al.

It is certified that error appears in the above-identified patent and that said Letters Patent is hereby corrected as shown below:

COLUMN 1:

Line 39, "its" should read --to have a--.

COLUMN 2:

Line 39, "can" should read --cannot--.
   Line 46, "it is" should read --in--.

COLUMN 5:

Line 19, "in," should read --ink--.

COLUMN 6:

Line 29, "recoded" should read --recorded--.

COLUMN 13:

Line 23, "that" should read --that as--.

Signed and Sealed this

Tenth Day of February, 2009

JOHN DOLL
*Acting Director of the United States Patent and Trademark Office*